(12) United States Patent  (10) Patent No.: US 8,723,912 B2
Michrowski et al.  (45) Date of Patent: *May 13, 2014

(54) SCENE BACKGROUND BLURRING INCLUDING FACE MODELING

(75) Inventors: Guy Michrowski, Tel-Aviv (IL); Gal Shabtay, Tel-Aviv (IL); Noy Cohen, Tel-Aviv (IL); Eyal Ben-Eliezer, Tel-Aviv (IL); Ephraim Goldenberg, Tel-Aviv (IL)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 349 days.

This patent is subject to a terminal disclaimer.

(21) Appl. No.: 12/883,191

(22) Filed: Sep. 16, 2010

(65) Prior Publication Data

US 2012/0007939 A1   Jan. 12, 2012

Related U.S. Application Data

(60) Provisional application No. 61/361,868, filed on Jul. 6, 2010.

(51) Int. Cl.
*H04N 7/14* (2006.01)
(52) U.S. Cl.
USPC ........................................ 348/14.01; 709/204
(58) Field of Classification Search
USPC .................. 348/14.01–14.09, 14.11; 709/204
See application file for complete search history.

(56) References Cited

U.S. PATENT DOCUMENTS

| | | | |
|---|---|---|---|
| 5,579,063 A | 11/1996 | Magnante et al. | |
| 5,781,650 A | 7/1998 | Lobo et al. | |
| 5,978,519 A | 11/1999 | Bollman et al. | |
| 6,256,058 B1 | 7/2001 | Kang et al. | |
| 6,407,777 B1 | 6/2002 | DeLuca | |
| 6,480,300 B1 | 11/2002 | Aoyama | |
| 6,571,003 B1 | 5/2003 | Hillebrand et al. | |
| 6,628,842 B1 | 9/2003 | Nagao | |
| 6,639,685 B1 | 10/2003 | Gu et al. | |
| 6,680,745 B2 | 1/2004 | Center, Jr. et al. | |
| 6,727,935 B1 | 4/2004 | Allen et al. | |

(Continued)

FOREIGN PATENT DOCUMENTS

| | | |
|---|---|---|
| WO | WO 2007/142621 A1 | 12/2007 |
| WO | WO 2009/061519 A1 | 5/2009 |
| WO | 2012/004682 A2 | 1/2012 |
| WO | 2012/004682 A3 | 6/2012 |

OTHER PUBLICATIONS

Notice of Allowance, dated Aug. 15, 2012, for U.S. Appl. No. 12/883,183, filed Sep. 16, 2010.

(Continued)

*Primary Examiner* — Maria El-Zoobi
(74) *Attorney, Agent, or Firm* — Hickman Palermo Truong Becker Bingham Wong LLP

(57) ABSTRACT

Different distances of two or more objects in a scene being captured in a video conference are determined based on applying a face model to a detected face within a digitally-acquired image. At least one portion of the scene other than the face is identified as comprising a background object that is a different distance from the video camera component than the face. The technique involves blurring or otherwise rendering unclear the background object.

33 Claims, 14 Drawing Sheets

(10 of 14 Drawing Sheet(s) Filed in Color)

(56) References Cited

U.S. PATENT DOCUMENTS

| | | | |
|---|---|---|---|
| 7,039,222 B2 | 5/2006 | Simon et al. | |
| 7,082,211 B2 | 7/2006 | Simon et al. | |
| 7,184,578 B2 | 2/2007 | Simon et al. | |
| 7,187,788 B2 | 3/2007 | Simon et al. | |
| 7,212,657 B2 | 5/2007 | Simon et al. | |
| 7,269,292 B2 | 9/2007 | Steinberg | |
| 7,271,839 B2 | 9/2007 | Lee et al. | |
| 7,295,233 B2 | 11/2007 | Steinberg et al. | |
| 7,308,156 B2 | 12/2007 | Steinberg et al. | |
| 7,315,631 B1 | 1/2008 | Corcoran et al. | |
| 7,336,821 B2 | 2/2008 | Ciuc et al. | |
| 7,352,394 B1 | 4/2008 | DeLuca et al. | |
| 7,362,368 B2 | 4/2008 | Steinberg et al. | |
| 7,403,643 B2 | 7/2008 | Ianculescu et al. | |
| 7,469,071 B2 | 12/2008 | Drimbarean et al. | |
| 7,515,740 B2 | 4/2009 | Corcoran et al. | |
| 7,551,755 B1 | 6/2009 | Steinberg et al. | |
| 7,583,287 B2 | 9/2009 | Cohen et al. | |
| 7,587,068 B1 | 9/2009 | Steinberg et al. | |
| 7,606,417 B2 | 10/2009 | Steinberg et al. | |
| 7,620,218 B2 | 11/2009 | Steinberg et al. | |
| 7,630,527 B2 | 12/2009 | Steinberg et al. | |
| 7,634,109 B2 | 12/2009 | Steinberg et al. | |
| 7,659,920 B2 | 2/2010 | Cohen et al. | |
| 7,676,108 B2 | 3/2010 | Steinberg et al. | |
| 7,680,342 B2 | 3/2010 | Steinberg et al. | |
| 7,684,630 B2 | 3/2010 | Steinberg | |
| 7,692,696 B2 | 4/2010 | Steinberg et al. | |
| 7,702,136 B2 | 4/2010 | Steinberg et al. | |
| 7,715,597 B2 | 5/2010 | Costache et al. | |
| 7,782,364 B2 | 8/2010 | Smith | |
| 2002/0081003 A1 | 6/2002 | Sobol | |
| 2002/0163572 A1 | 11/2002 | Center et al. | |
| 2003/0198384 A1 | 10/2003 | Vrhel | |
| 2003/0223622 A1 | 12/2003 | Simon et al. | |
| 2004/0080631 A1 | 4/2004 | Tominaga et al. | |
| 2004/0125228 A1* | 7/2004 | Dougherty | 348/345 |
| 2004/0170337 A1 | 9/2004 | Simon et al. | |
| 2005/0041121 A1 | 2/2005 | Steinberg et al. | |
| 2005/0068452 A1 | 3/2005 | Steinberg et al. | |
| 2005/0105779 A1* | 5/2005 | Kamei | 382/118 |
| 2006/0077261 A1 | 4/2006 | Tanaka et al. | |
| 2006/0098890 A1 | 5/2006 | Steinberg et al. | |
| 2006/0120599 A1 | 6/2006 | Steinberg et al. | |
| 2006/0140455 A1 | 6/2006 | Costache et al. | |
| 2006/0153470 A1 | 7/2006 | Simon et al. | |
| 2006/0204110 A1 | 9/2006 | Steinberg et al. | |
| 2006/0215016 A1 | 9/2006 | Cohen et al. | |
| 2006/0228037 A1 | 10/2006 | Simon et al. | |
| 2006/0228038 A1 | 10/2006 | Simon et al. | |
| 2006/0228039 A1 | 10/2006 | Simon et al. | |
| 2006/0228040 A1 | 10/2006 | Simon et al. | |
| 2006/0259755 A1 | 11/2006 | Kenoyer | |
| 2006/0276698 A1 | 12/2006 | Halldorsson et al. | |
| 2006/0285754 A1 | 12/2006 | Steinberg et al. | |
| 2007/0071347 A1 | 3/2007 | Li et al. | |
| 2007/0110305 A1 | 5/2007 | Corcoran et al. | |
| 2007/0147820 A1 | 6/2007 | Steinberg et al. | |
| 2007/0189748 A1 | 8/2007 | Drimbarean et al. | |
| 2007/0201724 A1 | 8/2007 | Steinberg et al. | |
| 2007/0229652 A1 | 10/2007 | Center et al. | |
| 2007/0269108 A1 | 11/2007 | Steinberg et al. | |
| 2007/0286520 A1* | 12/2007 | Zhang et al. | 382/264 |
| 2007/0296833 A1 | 12/2007 | Corcoran et al. | |
| 2008/0013798 A1 | 1/2008 | Ionita et al. | |
| 2008/0031498 A1 | 2/2008 | Corcoran et al. | |
| 2008/0037840 A1 | 2/2008 | Steinberg et al. | |
| 2008/0106615 A1 | 5/2008 | Ahonen et al. | |
| 2008/0112599 A1 | 5/2008 | Nanu et al. | |
| 2008/0175481 A1 | 7/2008 | Petrescu et al. | |
| 2008/0205712 A1 | 8/2008 | Ionita et al. | |
| 2008/0219517 A1 | 9/2008 | Blonk et al. | |
| 2008/0219518 A1 | 9/2008 | Steinberg et al. | |
| 2008/0219581 A1 | 9/2008 | Albu et al. | |
| 2008/0220750 A1 | 9/2008 | Steinberg et al. | |
| 2008/0232711 A1 | 9/2008 | Prilutsky et al. | |
| 2008/0240555 A1 | 10/2008 | Nanu et al. | |
| 2008/0259154 A1 | 10/2008 | Garrison et al. | |
| 2008/0267461 A1 | 10/2008 | Ianculescu et al. | |
| 2008/0292193 A1 | 11/2008 | Bigioi et al. | |
| 2008/0317379 A1 | 12/2008 | Steinberg et al. | |
| 2009/0002478 A1 | 1/2009 | Ueki | |
| 2009/0080713 A1 | 3/2009 | Bigioi et al. | |
| 2009/0080795 A1* | 3/2009 | Yano | 382/274 |
| 2009/0080797 A1 | 3/2009 | Nanu et al. | |
| 2009/0179998 A1 | 7/2009 | Steinberg et al. | |
| 2009/0179999 A1 | 7/2009 | Albu et al. | |
| 2009/0189997 A1 | 7/2009 | Stec et al. | |
| 2009/0189998 A1 | 7/2009 | Nanu et al. | |
| 2009/0190803 A1 | 7/2009 | Neghina et al. | |
| 2009/0196466 A1 | 8/2009 | Capata et al. | |
| 2009/0263022 A1 | 10/2009 | Petrescu et al. | |
| 2009/0273685 A1 | 11/2009 | Ciuc et al. | |
| 2009/0303342 A1 | 12/2009 | Corcoran et al. | |
| 2009/0303343 A1 | 12/2009 | Drimbarean et al. | |
| 2010/0053362 A1 | 3/2010 | Nanu et al. | |
| 2010/0053367 A1 | 3/2010 | Nanu et al. | |
| 2010/0053368 A1 | 3/2010 | Nanu et al. | |
| 2010/0054592 A1 | 3/2010 | Nanu et al. | |
| 2010/0141786 A1 | 6/2010 | Bigioi et al. | |
| 2010/0141787 A1 | 6/2010 | Bigioi et al. | |
| 2010/0164731 A1* | 7/2010 | Xie | 340/573.1 |
| 2010/0228825 A1* | 9/2010 | Hegde et al. | 709/204 |
| 2010/0329582 A1 | 12/2010 | Albu et al. | |
| 2011/0007174 A1 | 1/2011 | Bacivarov et al. | |
| 2011/0102553 A1* | 5/2011 | Corcoran et al. | 348/50 |
| 2011/0249074 A1 | 10/2011 | Cranfill et al. | |
| 2012/0007940 A1 | 1/2012 | Michrowski et al. | |
| 2012/0007942 A1 | 1/2012 | Michrowski et al. | |
| 2012/0026274 A1 | 2/2012 | Baker et al. | |
| 2012/0050458 A1 | 3/2012 | Mauchly et al. | |
| 2012/0081500 A1 | 4/2012 | Border et al. | |

OTHER PUBLICATIONS

PCT Notification of Transmittal of the International Search Report and the Written Opinion of the International Searching Authority, or the Declaration, for PCT application No. PCT/IB2011/002286, report dated Apr. 17, 2012, 12 pages.
Co-pending U.S. Appl. No. 12/790,594, filed May 28, 2010.
Co-pending U.S. Appl. No. 12/820,034, filed Jun. 21, 2010.
Co-pending U.S. Appl. No. 12/820,086, filed Jun. 21, 2010.
Co-pending U.S. Appl. No. 12/824,204, filed Jun. 27, 2010.
Co-pending U.S. Appl. No. 12/834,901, filed Jul. 13, 2010.
Co-pending U.S. Appl. No. 12/941,995, filed Nov. 8, 2010.
Notice of Allowance, dated Dec. 11, 2012, for U.S. Appl. No. 12/883,183, filed Sep. 16, 2010.
Notice of Allowance, dated Aug. 31, 2012, for U.S. Appl. No. 12/883,192, filed Sep. 16, 2010.
Notice of Allowance, dated Oct. 25, 2012, for U.S. Appl. No. 12/883,192, filed Sep. 16, 2010.
Notice of Allowance, dated Nov. 20, 2012, for U.S. Appl. No. 12/883,192, filed Sep. 16, 2010.
PCT Notification of Transmittal of International Preliminary Report on Patentability Chapter I (IB/326), including the International Preliminary Report on Patentability Chapter I (IB/373), for PCT Application No. PCT/IB2011/002286, report dated Jan. 8, 2013, 6 pages.

* cited by examiner

SBB – Scene Background Blurring Feature
 
SBB off
SBB on
Figure 1A
Figure 1B Depth Estimation Through Longitudinal Chromatic Aberrations Relative Sharpness Measurements During AF Convergence Using Depth Map to Control DOF via OptiML™ Focus Engine

Digital Iris: Extended Depth of Field (Narrow Aperture Mode)

Digital Iris: Wide Aperture Mode (focus at far)

Digital Iris: Broken Effect

Digital Iris: Extended Depth of Field (Narrow Aperture Mode)

Digital Iris: Wide Aperture Mode (focus at far)

SCENE BACKGROUND BLURRING INCLUDING FACE MODELING

PRIORITY AND RELATED APPLICATIONS

This application claims priority to U.S. provisional patent application No. 61/361,868, filed Jul. 6, 2010. This application is one of a series of three contemporaneously-filed applications, including those entitled SCENE BACKGROUND BLURRING INCLUDING DETERMINING A DEPTH MAP (U.S. patent application Ser. No. 12/883,183), SCENE BACKGROUND BLURRING INCLUDING FACE MODELING (U.S. patent application Ser. No. 12/883,191), AND SCENE BACKGROUND BLURRING INCLUDING RANGE MEASUREMENT (U.S. patent application Ser. No. 12/883,192).

BACKGROUND OF THE INVENTION

Video conference calls can be made using a wide variety of devices, such as office video conferencing systems, personal computers, and telephone devices including mobile telephones. Thus, video conferencing can be used at many different locations, including company offices, private residences, internet cafés and even on the street. The many possibilities and varied locations for holding video conferences can create a problem since the video conference camera reveals the location of the participant to all those watching or participating in the video conference. For instance, if a video conference call is made from a participant's private place of residence, the participant's privacy may be compromised since the participant's private environment and members of his or her household may be exposed and photographed during the video conference call. It is desired to be able to maintain the privacy and confidentiality of other commercial issues that may inadvertently otherwise appear in the background of a video conference. It is desired to have a technique that ensures that such items will not be revealed or shared during the video conference.

Range measurement is important in several applications, including axial chromatic aberration correction, surveillance means, and safety means. Active methods for calculating the distance between an object and a measuring apparatus are usually based on the measurement of the time required for a reflected electro-magnetic or acoustic wave to reach and be measured by measuring apparatus, e.g., sonar and radar. Active methods of range measurement are detrimentally affected by physical objects present in the medium between the measuring apparatus and the object. Current passive methods use an autofocus mechanism. However, determining the range typically involves varying the focal length by changing lens position, which is not available in camera phones and many other camera-enabled devices.

Digital cameras are usually equipped with iris modules designed to control exposure, which are based on a detection result received from the sensor. Due to size and cost limitations, camera phones usually have fixed apertures and, hence, fixed F numbers. Existing mechanical iris modules are difficult to even incorporate in their simplest form into camera phones due to increased price of optical module, increased form factor since the iris module height is about 1 mm, greater mechanical sensitivity, consumption of electrical power, and complex integration (yield).

Digital cameras are usually equipped with iris modules designed to control exposure, which is based on a detection result received from a sensor. Due to size and cost limitations, camera phones usually have fixed apertures and, hence, fixed F numbers. Mobile phone cameras commonly have apertures that provide F numbers in the range of F/2.4-F/2.8. An advantage of the higher value, F/2.8, is mainly in its image resolution, but a drawback can be low performance under low light conditions. The lower value, F/2.4, compromises depth of focus and image resolution for a faster lens, i.e., better performance under low light conditions. Alternatively, a ND filter may be used to control exposure instead of changing F/#. Several high-end modules address the above-mentioned problems using mechanically adjustable apertures. Incorporating iris modules into camera phones offers a variable F number and achieves multiple advantages, including image quality improvement due to reduced motion blur, improved SNR and improved resolution. In addition, incorporation of iris modules into camera phones can tend to impart a digital still camera like "feel" due to the variable depth of field, i.e. Bokeh effect. Disadvantages of incorporating iris modules into camera phones include the increased price of the optical module, increased form factor due to the iris module height being about 1 mm, greater mechanical sensitivity, consumption of electrical power, and complex integration (yield). It is desired to have a digital iris that enables the user to enjoy the advantages of the mechanical iris without its disadvantages and to experience the "feel" of a digital still camera.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A illustrates a video conference display including a person's face in the foreground and clearly visible background items.

FIG. 1B illustrates a video conference display including a person's face, neck and shoulders against a blurred background.

DETAILED DESCRIPTIONS OF THE EMBODIMENTS

A method is provided to display a participant during a video conference against a blurred or otherwise unclear background. The method according to certain embodiments involves determining different distances of two or more objects in a scene being captured in video, including performing an auto-focus sweep of the scene. A depth map of the scene is generated based on the auto-focus sweep. At least one of the objects is identified as a foreground object or a background object, or one or more of each, based on the determining of the different distances. The method further involves blurring or otherwise rendering unclear at least one background object and/or one or more portions of the scene other than the at least one foreground object, also based on the determining of distances.

Figure 2:
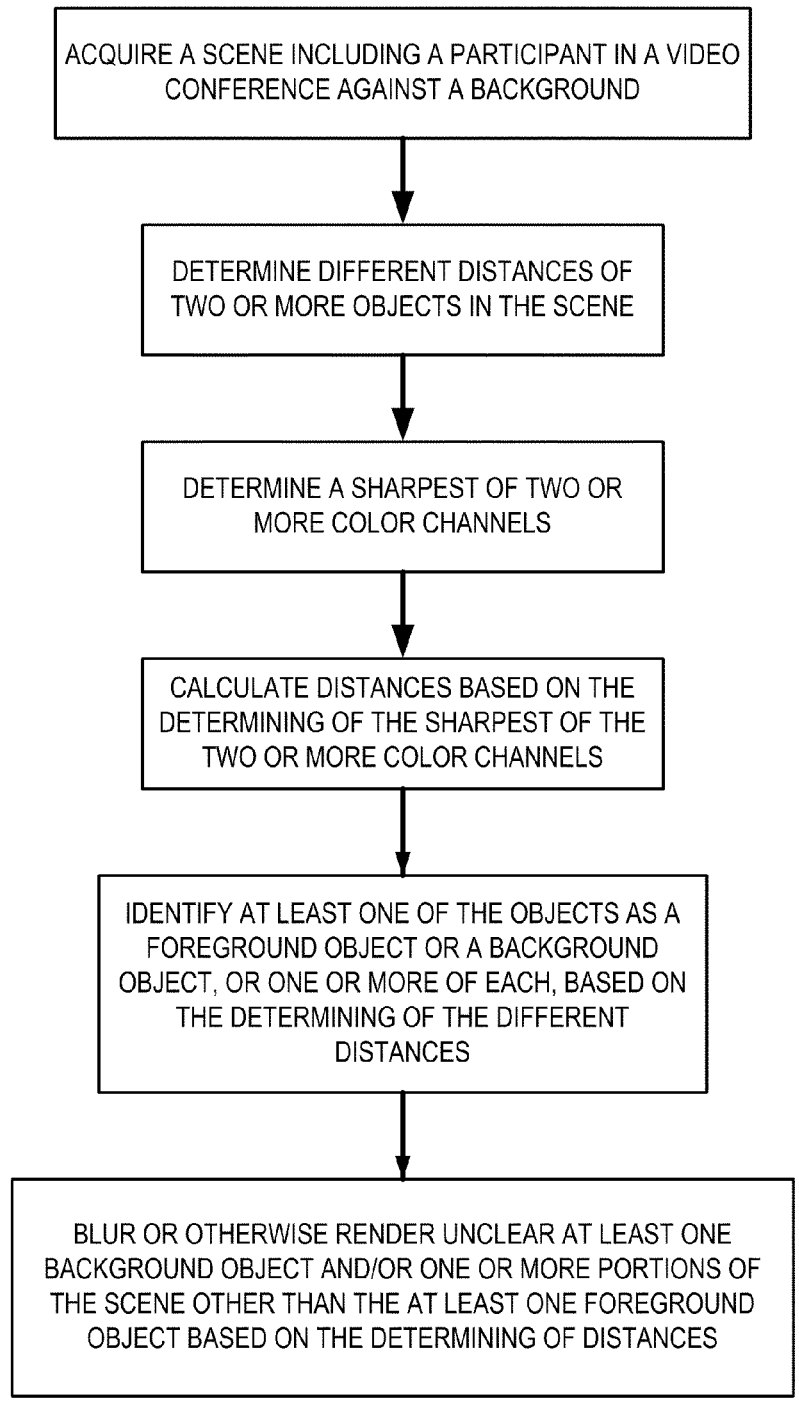
FIG. 2 is a flow chart of an exemplary method in accordance with certain embodiments.

A further method is provided, e.g., as illustrated in the flowchart of FIG. 2, to display a participant during a video conference against a blurred or otherwise unclear background. The method includes determining different distances of two or more objects in a scene being captured in video, including determining a sharpest of two or more color channels and calculating distances based on the determining of the sharpest of the two or more color channels. At least one of the objects is identified as a foreground object or a background object, or one or more of each are identified, based on the determining of the different distances. The method further includes blurring or otherwise rendering unclear at least one background object or one or more portions of the scene other than the at least one foreground object, or combinations thereof, also based on the determining of distances.

A face may be detected within the scene and designating as a foreground object. An audio or visual parameter of the face, or both, may be enhanced, such as, e.g., loudness, audio tone, or sound balance of words being spoken by a person associated with the face, or enhancing luminance, color, contrast, or size or location within the scene of the face, or combinations thereof. The method may include recognizing and identifying the face as that of a specific person, and the face may be tagged with a stored identifier. A nearest object may be designated as a foreground object. One or more objects may be designated as background that are at a different distance than a foreground object. A nearest object or a detected face, or both, may be designated as the foreground object. The determining of the different distances may involve use of a fixed focus lens. A portion of the scene other than a foreground object may include a detected and recognized face or other object, and the method may also include determining that the recognized face or other object is private (and, e.g., made subject to being blurred or otherwise rendered unclear). The distances may include a distance between a video camera component and at least one of the two or more objects in the scene. One or more distances may be determined based on applying a face model to a detected face within the scene. The determining of the sharpest of two or more color channel may involve calculating the following:

$$\text{sharpest} = \left\{ j \,\middle|\, \frac{\sigma_j}{AV_j} = \max\left\{ \frac{\sigma_r}{AV_r}; \frac{\sigma_g}{AV_g}; \frac{\sigma_b}{AV_b} \right\} \right\} \quad (3$$

where AVi comprise averages of pixels for the three color channels {j|r, g, b}, and may further involve calculating one or both of the following:

$$\sigma_i = \sqrt{\frac{1}{N} \sum_{pixels \in i} \sum (i - Av_i)^2} \quad (1$$

where $i \in \{R, G, B\}$

Or $$\sigma_i \cong \frac{1}{N} \sum_{pixels \in i} \sum |i - Av_i| \quad (2$$

where $i \in \{R, G, B\}$

Figure 3:
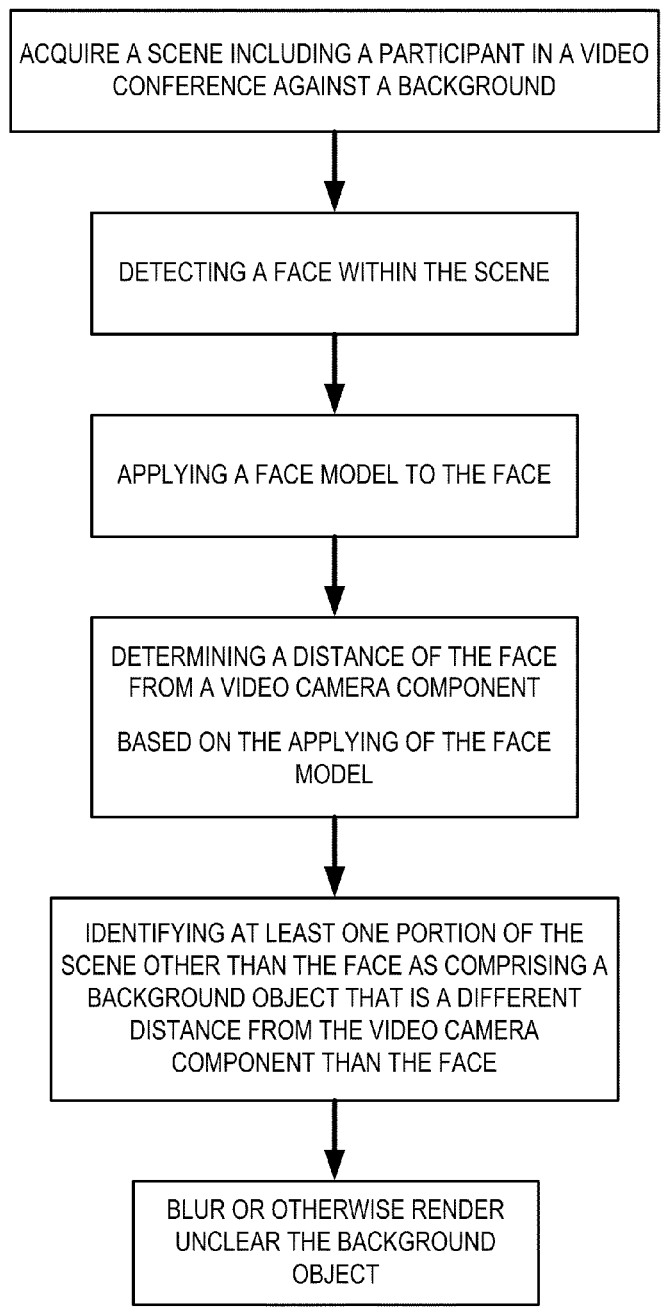
FIG. 3 is a flow chart of an exemplary method in accordance with certain embodiments.

Another method is provided, e.g., as illustrated in the flowchart of FIG. 3, to display a participant during a video conference against a blurred or otherwise unclear background. A face is detected within a digitally-acquired image. A face model is applied to the face. A distance of the face from a video camera component is determined based on the applying of the face model. At least one portion of the scene other than the face is identified as including a background object that is a different distance from the video camera component than the face. The background object is blurring or otherwise rendered unclear.

An audio or visual parameter of the face, or both, may be enhanced, such as, e.g., loudness, audio tone, or sound balance of words being spoken by a person associated with the face, or enhancing luminance, color, contrast, or size or location within the scene of the face, or combinations thereof. The method may include recognizing and identifying the face as that of a specific person, and the face may be tagged with a stored identifier.

The method may further include increasing a size of the face or centering the face, or both. Any one or more of brightness, luminance contrast, color or color balance of the face may be enhanced. The determining of the distance of the face from the video camera component may include determining one or more distances and/or other geometric characteristics of detected face features. The determining of the distance of the face from the video camera component may involve determining a sharpest of two or more color channels and calculating the distance based on the determining of the sharpest of the two or more color channels. The determining of the different distances may involve use of a fixed focus lens.

The determining of the sharpest of two or more color channel may involve calculating the following:

$$\text{sharpest} = \left\{ j \,\middle|\, \frac{\sigma_j}{AV_j} = \max\left(\frac{\sigma_r}{AV_r}; \frac{\sigma_g}{AV_g}; \frac{\sigma_b}{AV_b}\right) \right\} \quad (3)$$

where AVi comprise averages of pixels for the three color channels {j|r, g, b}, and may further involve calculating one or both of the following:

$$\sigma_i = \sqrt{\frac{1}{N} \sum_{pixels \in i} \sum (i - AV_i)^2} \quad (1)$$

where $i \in \{R, G, B\}$

Or $$\sigma_i \cong \frac{1}{N} \sum_{pixels \in i} \sum |i - AV_i| \quad (2)$$

where $i \in \{R, G, B\}$

One or more computer-readable storage media having code embedded therein for programming a processor to perform any of the methods described herein.

A video conferencing apparatus is also provided, including a video camera including a lens, and an image sensor, a microphone, a display, a processor, one or more networking connectors, and a memory having code embedded therein for programming a processor to perform any of the methods described herein.

Scene Background Blurring

A method is provided that enables video conference participants to be seen in focus while the rest of the scene around them is blurred. Thus, participants can maintain their privacy and confidentiality of other commercial issues they do not wish to reveal or share. The method may include face identification of the participant and an estimation of the distance between the participant and the lens, or alternatively, the identification of those objects that are at a distance from the participant.

The method advantageously permits the maintenance of privacy of participants in video conferences, safeguards confidential information, and enables such calls to be made from any location without divulging the exact nature of the location from which the call is being made. Another advantage is the ability to use an existing face identification software package.

Embodiments are described that solve the above-mentioned problems of maintaining privacy in video conferencing, namely scene background blurring or SBB. Scene background blurring is based on the real-time estimation of the distance between objects in the scene. Specifically, the method may involve estimating the distance between the camera lens and the location of the person participating in the video conference call. Using image processing and the knowledge of this distance, it is possible to blur all other details that are located at a greater (and/or lesser) distance from the lens (see FIGS. 1A-1B). In order to estimate the distance between the video conference participant and the camera lens, face identification software may be used to identify the participant's location and then to estimate the participant's distance from the lens. Alternatively, the system can determine which of the objects are farther away from the lens than the participant. Thus, it is possible to selectively blur the information that is farther away (and/or closer) than the participant. The distance from the lens to the participant or the relative distance between the objects and the participant can be determined using various optical properties as described hereinbelow. For example, a method that uses the relation between the focal length and the dispersion of the lens material, i.e., the variation of the refractive index, n, with the wavelength of light, may be used. The different position of the focal plane for different colors enables a determination of the distance of an object from the lens. It is also possible to utilize the eyes distance which is known to be 6-7 cm, or another geometric face feature or human profile feature, for estimating the relative distance of the participant. Other optical properties can also be used to determine which objects are farther away than the person identified. This can be achieved as part of an optical system that includes both image processing and the SBB or as part of a software system that can be implemented flexibly in cameras used for video conferencing.

Sharp, selective imaging of the participant or any other element of the image may be provided in a video conference, while the more distant environment may be blurred (and/or closer objects like desk items and the like). The method may involve face identification of the participant and an estimation of the distance between the participant and the camera lens, or alternatively, identification of objects that are at a different distance from the participant.

Range Measurement Applied on a Bayer Image Pattern

The dependence of focal length on the dispersion of the lens material of a camera is used in certain embodiments. This dependence has to do with the variation of the refractive index n with wavelengths of light. The variation of the focal length for different colors provides a sharp channel (one of the R, G or B channels), while the rest of the channels are blurry. This enables at least a rough determination of the distance of an object from the camera lens.

Unlike active methods of range measurement, passive methods are less affected by physical objects (such as window panes or trees) that may be present in the medium between the measuring apparatus and the object. Moreover, passive methods tend to be more accurate. It is also advantageous for a method that it is to be part of an ISP chain to work directly on a Bayer Image pattern, because there is significantly more flexibility in the placement of the block within the ISP chain. Moreover, ranges can be roughly determined with a fixed focus lens. A passive method for range measurement in accordance with certain embodiments uses dispersion means, i.e., involves finding a sharpest channel between the R, G, and B color channels.

Embodiments are described herein of passive range measurement techniques that operates on a Bayer pattern, thus combining both advantages. In one example, a 9×9 Bayer window may be used, and three colors (R, G, and B) may be used, although different windows and different combinations of two or more colors may be used. In one embodiment, an expansion to four colors (R, Gr, Gb, B) may be involved, whereby Gr are the green pixels in a red line and Gb are the green pixels in a blue line.

Three averages may be calculated for the red, green, and blue pixels respectively (AVr, AVg, AVg). A measure of the amount of information may be calculated. Such a measure may be obtained, for instance, without loss of generality, by calculating the standard deviation or the average absolute deviation of each color (see Equations 1 and 2 below). Then, a sharpness measure may be derived, e.g., defined by σj/AVj and the sharpest color is chosen (see Equation 3 below). For far objects, the vast majority of results from Step 3 are 'j=R' while for close objects, the vast majority of results are 'j=B'. If most of the results are 'j=G', the object is located at mid-range.

The range measurement can be refined even further since the transition from close to mid-range and then to far-range may be gradual. Therefore it is expected that in regions that are between close- and mid-range, a mixture of j=B and j=G will be obtained, while in regions between mid-range and far-range, a mixture of j=B and j=G will predominate. It is therefore possible to apply statistics, (the probability that a certain color channel will be the sharpest within a certain region), in order to more accurately determine the distance between an object and the lens. The following equations may be used in a passive method for range measurement applied directly on a BAYER image pattern. The three averages of the red green and blue pixels may be respectively referred to as (AVr, AVg, AVb).

The measure for the amount of information may be given, without loss of generality, by the following examples:

$$\sigma_i = \sqrt{\frac{1}{N} \sum_{pixels \in i} \sum (i - AV_i)^2} \quad (1$$

where $i \in \{R, G, B\}$ or $$\sigma_i \cong \frac{1}{N} \sum_{pixels \in i} \sum |i - AV_i| \quad (2$$

where $i \in \{R, G, B\}$

The sharpest channel may be provided by:

$$\text{sharpest} = \left\{ j \,\middle|\, \frac{\sigma_j}{AV_j} = \max\left(\frac{\sigma_r}{AV_r}; \frac{\sigma_g}{AV_g}; \frac{\sigma_b}{AV_b}\right) \right\} \quad (3$$

Digital Iris

A digital iris system in accordance with certain embodiments can achieve the effect of variable F/#. In addition, the system takes advantage of low F/# in low-light captures, creating effects such as the Bokeh effect (which generally is not achieved with a typical mechanical camera phone iris of F/2.4-4.8). This system enables users to enhance their experience by controlling depth of field. Additional advantages of the system include lower cost, lower module height, lower complexity, and greater robustness.

The digital iris enables the user to enjoy, on a device that does not include a mechanical iris, the advantages of a device that includes a mechanical iris without its disadvantages, and to experience the "feel" of a digital still camera. Those advantages include better performance in low-light environments, elimination of motion blur, and improved signal-to-noise ratio (SNR). Additional advantages of the system include lower cost, lower module height, lower complexity, and greater robustness.

A digital iris is provided in accordance with certain embodiments that acts with respect to a subject image, and performs advantageous digital exposure of one or more desired portions of the subject to be photographed. Advantages include better performance in low-light environments, elimination of motion blur, and improved SNR. Under good light conditions, a large depth of field is obtained, which can be controlled by the user. Users' experiences can be enhanced by the Bokeh effect, whereby the background of a photo is out of focus, while a blur effect has a unique aesthetic quality.

Two distinct possibilities for lens design are related to their F/# values, which are closely connected to the exposure value. The F number is defined as the focal length divided by the effective aperture diameter (f_eff/D). Each f-stop (exposure value) halves the light intensity relative to the previous stop. For the case of Low-F/# lenses (wide aperture), advantages include short exposure time, less motion blur, high resolution at focus, reduced depth of field—Bokeh effect, and improved low-light performance (less noise for the same exposure time). In certain embodiments, disadvantages such as tighter manufacturing tolerances, flare due to manufacturing errors, and diminished depth of field (with the lack of AF technology) are reduced or eliminated. For the case of high-F/# lenses (narrow aperture), advantages include large depth of field, improved low-frequency behavior (contrast), reduced flare, finer saturated edges, and relaxed manufacturing tolerances. In certain embodiments, disadvantages such as long exposure time, motion blur, and low-light noise performance are reduced or eliminated.

Figure 4:
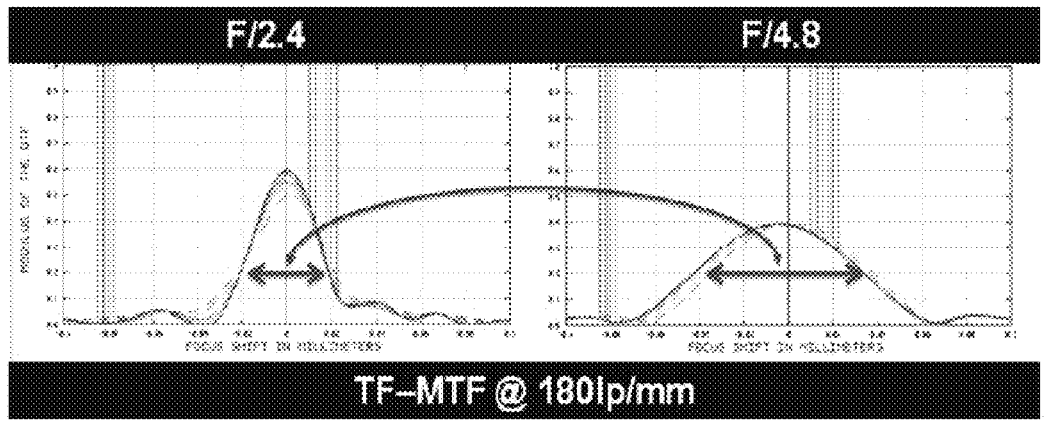
FIG. 4 illustrates a digital iris in accordance with certain embodiments.
Figure 5:
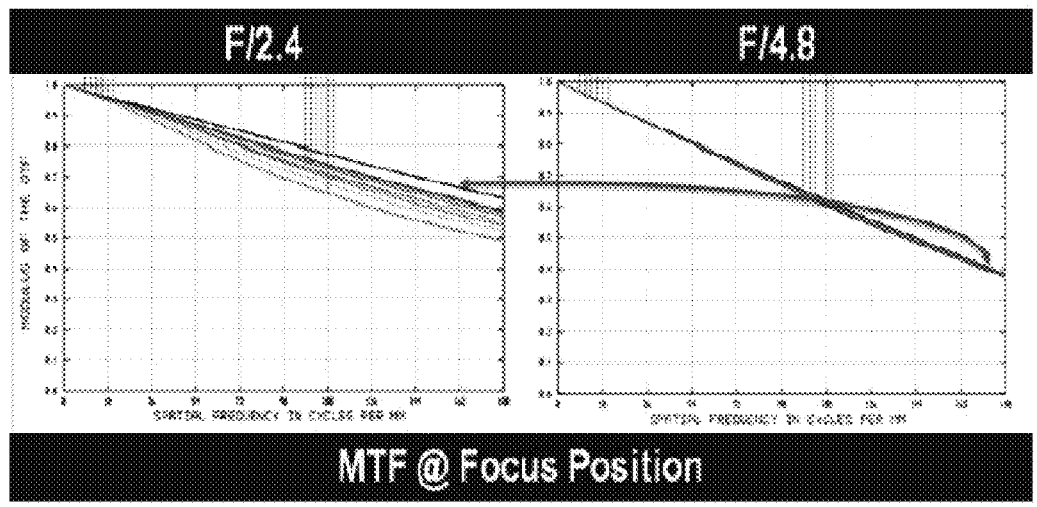
FIG. 5 illustrates plots of calculated MTF curves per mm vs. defocus distance for high F/# compared to low F/# for the same focal length.

A digital iris in accordance with certain embodiments is illustrated at FIG. 4, which shows a calculated through-focus MTF at a spatial frequency of 180 cycles per mm versus defocus distance (in units of millimeters) for high F/# compared to low F/# both for the same focal length. In FIG. 4, the arrows superimposed on the through-focus MTF correspond to a delimit range of defocus distance over which the MTF is greater than 0.15. The defocus distances include the depth of field over which the range of defocus distances provide a contrast that is sufficient for resolving the image. FIG. 4 exhibits an enhanced depth of focus for the case of the higher F/#. Our results show that the DOF depends linearly on the F/#. FIG. 5 shows plots of calculated MTF curves for the imaging lens design for object distance of about 1 m at different light wavelengths. The obtained resolution limit is found to be inversely proportional to the F/# of the lens. The lower F/# lenses reach higher spatial resolution, but field dependency is larger (mainly the tangential components).

Figure 6:
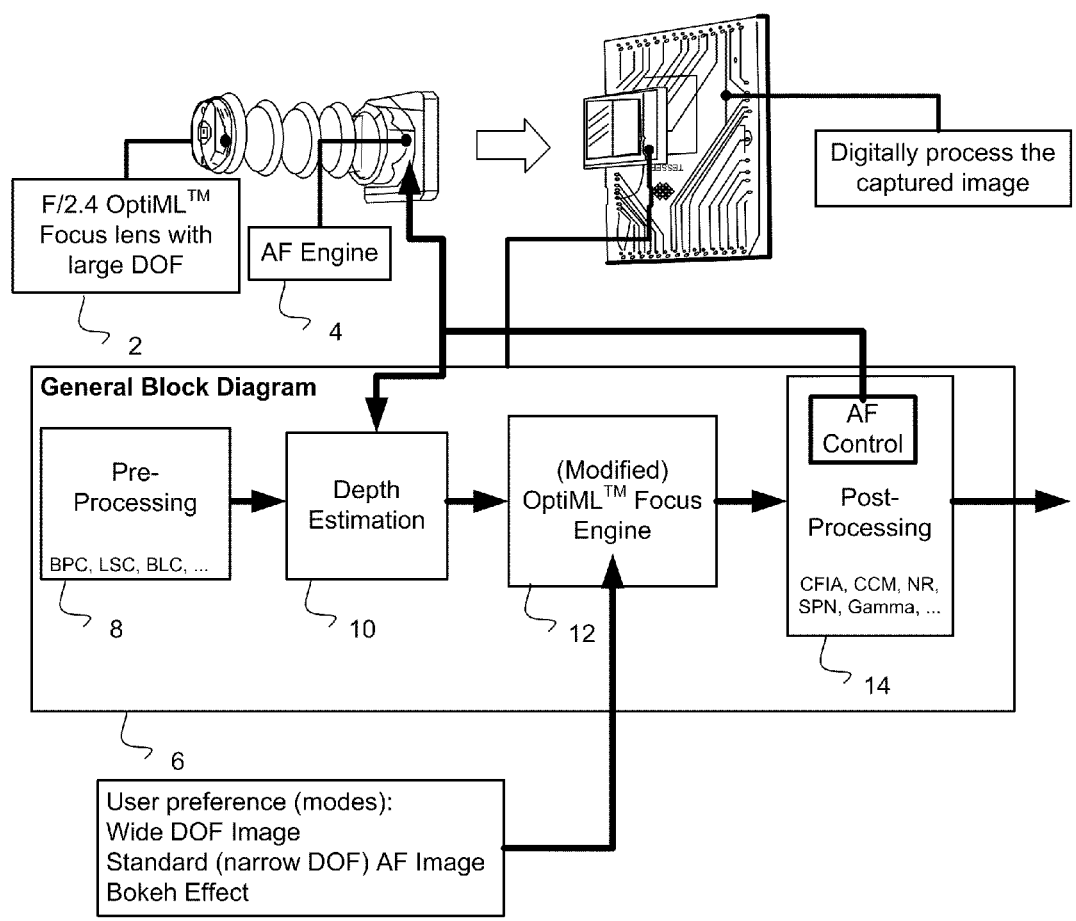
FIG. 6 illustrates a digital iris in accordance with certain embodiments.

As an example, a digital iris may be addressed for an F number of F/2.4 in certain embodiments. The lens may be designed with a wide aperture lens, i.e. low F number of F/2.4, where the reduced DOF (see FIG. 4) is extended to F/4.8 using a technique such as that described at US patent application serial number PCT/US08/12670, filed Nov. 7, 2008 based on U.S. provisional Ser. No. 61/002,262, filed Nov. 7, 2007, entitled "CUSTOMIZED DEPTH OF FIELD OPTICAL SYSTEM", which are assigned to the same assignee and are hereby incorporated by reference. FIG. 6 illustrates a simplified block diagram of a digital iris architecture in accordance with this exemplary embodiment. As illustrated at FIG. 6, the digital iris comprises in this example three independent components: a lens 2 with low F/# and extended depth of field (EDoF) standard mechanical AF engine 4, and Image processing algorithm block 6 with pre-processing 8, depth estimation 10 that generates a depth map of the image. Also, a focus engine 12 may be used to support the EDoF and also to provide a digital aesthetic blur function, and post-processing 14.

Figure 7A:
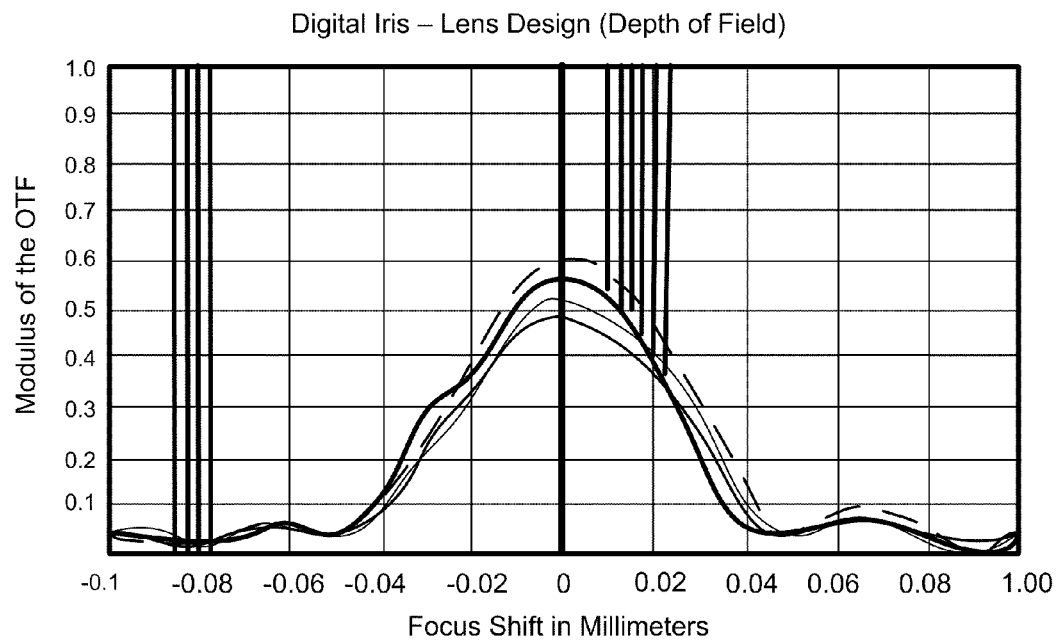
FIGS. 7A-7B illustrate plots of calculated MTF curves and through-focus MTF in accordance with certain embodiments.
Figure 7B:
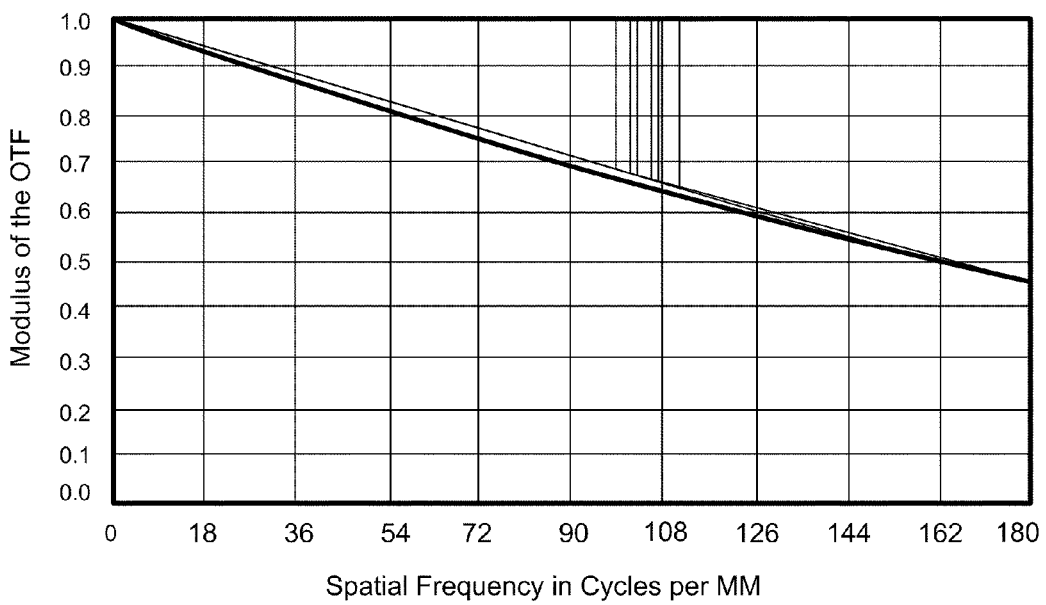

FIG. 7A-7B illustrates plots of calculated MTF curves and the through-focus MTFs in accordance with certain embodiments. FIGS. 7A-7B show that for F/2.4 the calculated through-focus MTF at a spatial frequency of 180 cycles per mm the MTF is extended compared to that shown in FIG. 4. The corresponding delimit range of defocus distance over which the MTF is greater than 0.15, becomes in accordance with certain embodiments almost equal to that of F/4.8 lens as is illustrated at FIG. 4. The calculated MTF curves keep the value that enables high spatial resolution as illustrated at FIG. 5 for the lens with F/2.4. Estimation depth is useful for the digital iris application. Under good light conditions, a large depth of field may be obtained, which can be controlled by the user. For each pixel used for the depth map, it can be determined where it is in focus and what the distance of it is from a finally selected focus plan. This distance will determine how much blur to introduce to this pixel when the digital post processing is applied. In the present embodiment of the digital iris, the focus plane may be determined by auto focus (AF) engine 4 (see FIG. 6), according to user preference.

Figure 8A:
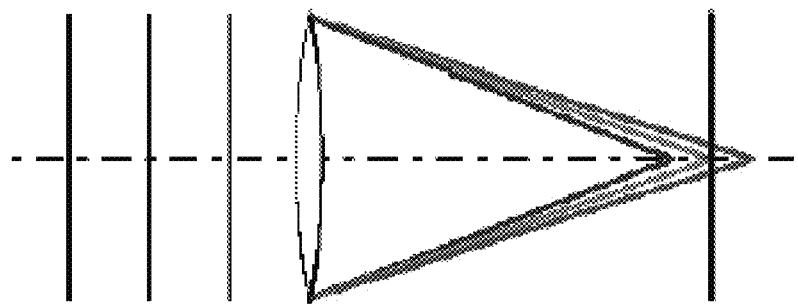
FIGS. 8A-8B illustrate depth estimation using knowledge of longitudinal chromatic aberrations in accordance with certain embodiments.
Figure 8B:
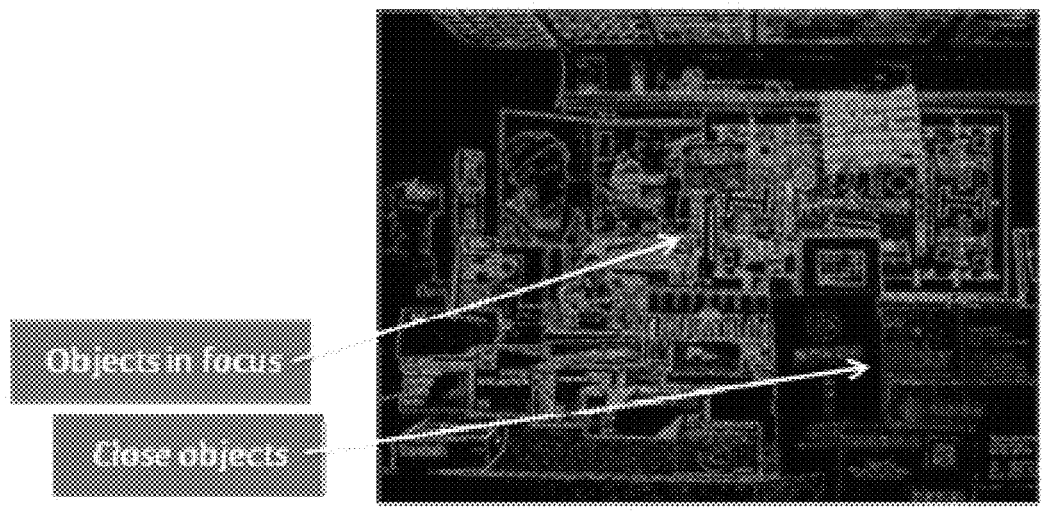

One example approach that may be used for generating the depth map include using the focal length dependence on the dispersion of the lens material i.e. the variation of the refractive index, n, with the wavelength of light. The different position of the focal plan for different colors enables a determination of a range of an object from the lens, see FIGS. 8A and 8B. This technique is passive and operates on the BAYER pattern, i.e., the three colors (R, G and B).

Figure 9:
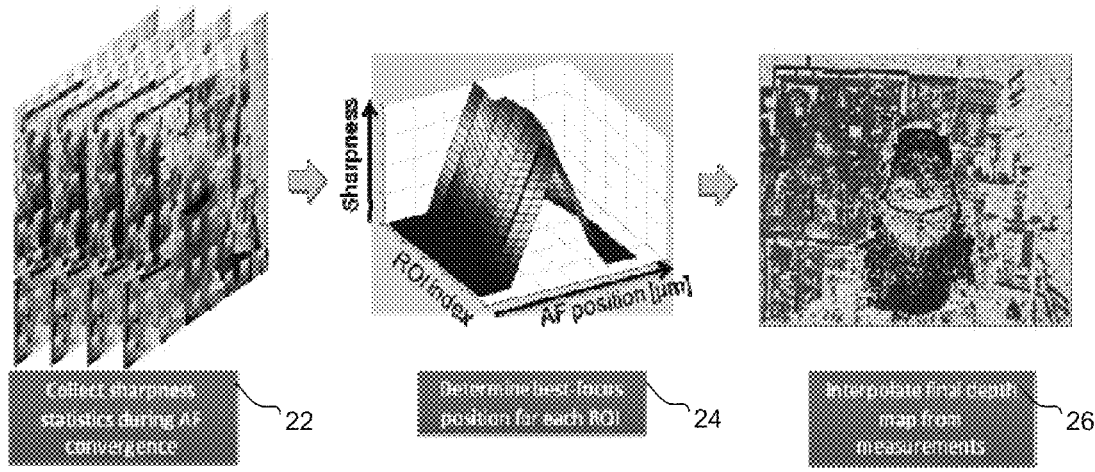
FIG. 9 illustrates relative sharpness measurements during autofocus convergence in accordance with certain embodiments.

Another example approach uses relative sharpness measurements during auto-focus (AF) convergence (with sub-sampled images), and is illustrated at FIG. 9. Statistics are collected at 22 in this embodiment at multiple locations over the field of view (FOV). Best-focus positions for each region of interest (ROI) are determined at 24. A depth map is generated at 26. Sharpness statistics may be collected on a preview stream during an AF convergence process at various image locations. A best focus position may be estimated for each location by comparing sharpness at different focus positions. After AF converges, the depth map may be calculated from the focus position measurements.

Figure 10:
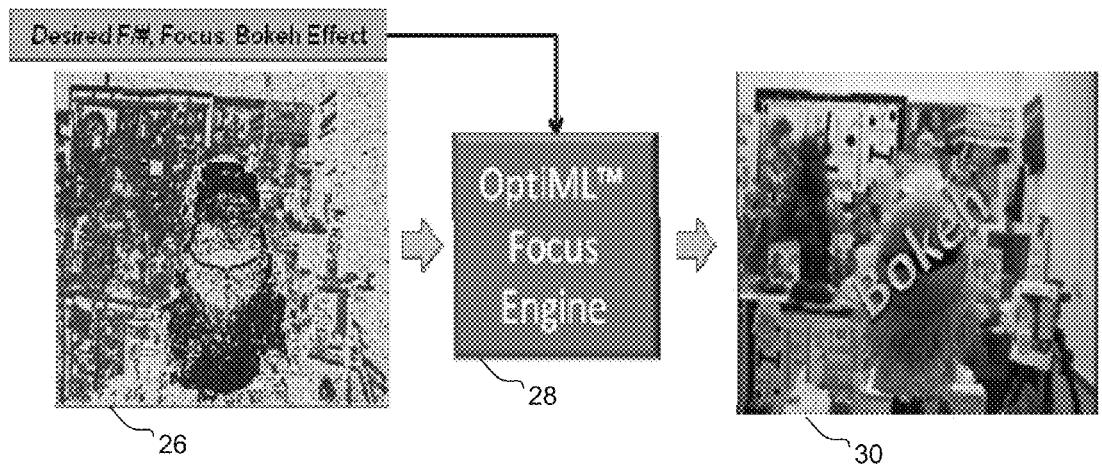
FIG. 10 illustrates using depth map to control depth of focus in accordance with certain embodiments.

FIG. 10 shows as an example a depth map 26 that is used to control depth of focus (DOF) via focus engine 28 in accordance with an embodiment of the digital iris system. The depth map information may be input to the focus engine 28 along with user-selected F/#. This focus engine may be used to enhance sharpness or artistically blur the image to achieve a desired effect. Wide-DOF (large F/#) may be generated by applying a standard focus algorithm. Narrow-DOF (small F/#) may be generated by somewhat blurring objects outside the focus plane. Bokeh effect is achieved 30 by applying large blur.

Figure 11:
FIG. 11 illustrates an extended depth of field using a digital iris in accordance with certain embodiments.
Figure 12:
FIG. 12 illustrates an auto focus mode using a digital iris in accordance with certain embodiments.
Figure 13:
FIG. 13 illustrates a Bokeh effect using a digital iris in accordance with certain embodiments.
Figure 14:
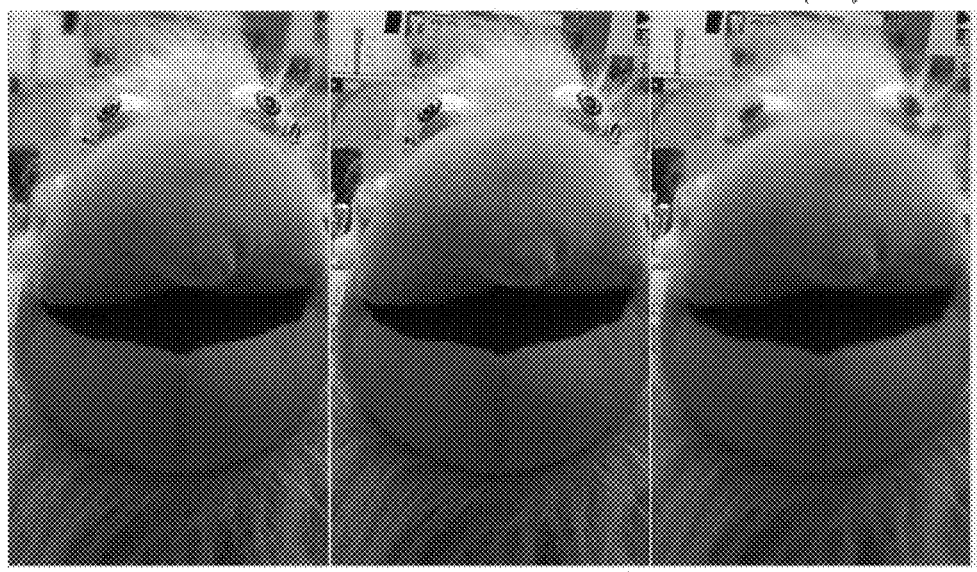
FIG. 14 illustrates a comparison of the three different modes illustrated in FIGS. 11-13.
Figure 15:
FIG. 15 illustrates an extended depth of field using a digital iris in narrow aperture mode in accordance with certain embodiments.
Figure 16:
FIG. 16 illustrates an auto-focus mode using a digital iris in wide aperture mode with focus at far in accordance with certain embodiments.
Figure 17:
FIG. 17 illustrates a Bokeh effect using a digital iris in accordance with certain embodiments.
Figure 18:
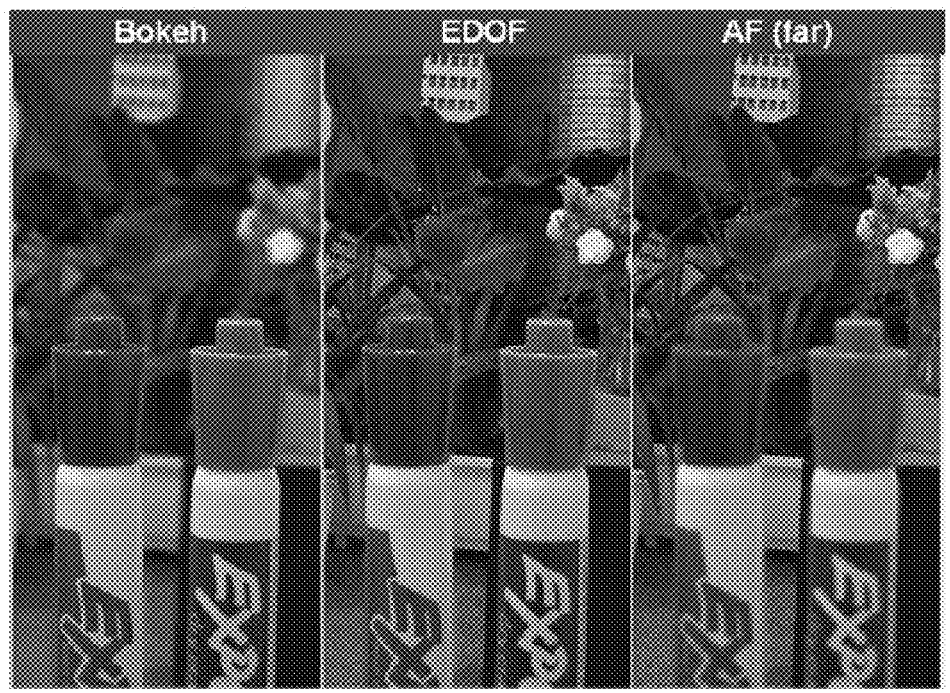
FIG. 18 illustrates a comparison of the three different modes illustrated in FIGS. 15-17.
Figure 19:
FIG. 19 illustrates extended depth of field using a digital iris in narrow aperture mode in accordance with certain embodiments.
Figure 20:
FIG. 20 illustrates an auto-focus mode using a digital iris in wide aperture mode with focus at far in accordance with certain embodiments.
Figure 21:
FIG. 21 illustrates a Bokeh effect using a digital iris in accordance with certain embodiments.
Figure 22:
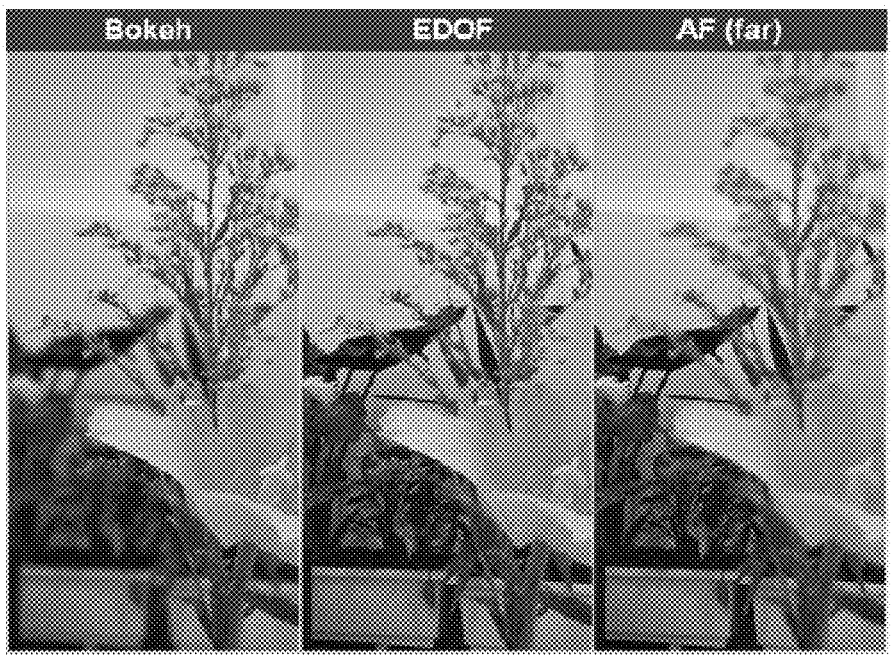
FIG. 22 illustrates a comparison of the three different modes illustrated in FIGS. 19-21.

FIGS. 11-22 now illustrate multiple examples of images taken with three modules. FIGS. 11-13 present images obtained with three different modules, whereas FIG. 14 presents a comparison between them which displays the advantage of the digital iris with EDoF. FIGS. 15-17 present a comparison between narrow apertures, a wide aperture and the Bokeh effect. FIG. 18 presents a comparison between them which displays the advantage of the digital iris with EDoF. FIGS. 18-21 present another comparison to emphasize the advantage of the digital iris. FIG. 22 presents a comparison between them which displays the advantage of the digital iris with EDoF.

The digital iris may be based on a low F/# lens design with extended depth of field. Digital processing modes of low F/# mode to reduce the depth of field of the lens and large F/# mode to keep the extended depth of field, as well as Bokeh mode are all advantageous. An estimation depth map may be generated by relative sharpness measurements during AF convergence and/or based on the focal length dependence on the dispersion of the lens material.

In certain embodiments, a method of displaying a participant during a video conference against a blurred or otherwise unclear background is provided. Distances are determined of two or more objects in a scene being captured in video. The method may include identifying at least one of the objects as a foreground object based on the determining of distances, and/or blurring or otherwise rendering unclear one or more portions of the scene other than the at least one foreground object also based on the determining of distances.

In certain embodiments, a method of displaying a participant during a video conference against a blurred or otherwise unclear background is further provided. Distances are determined of two or more objects in a scene being captured in video. The method may further include identifying at least one of the objects as a background object based on the determining of distances, and/or blurring or otherwise rendering unclear the at least one background object based on the determining of distances.

A face may be detected within the scene and designated as a foreground object. A nearest object may be designated as a foreground object. One or more objects may be designated as background that are at a different distance than a foreground object. A nearest object or a detected face, or both, may be designated as foreground objects. The determining distances may involve determining a sharpest of two or more color channels and calculating distances based on the determining of the sharpest of the two or more color channels.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

The following are incorporated by reference: U.S. Pat. Nos. 7,715,597, 7,702,136, 7,692,696, 7,684,630, 7,680,342, 7,676,108, 7,634,109, 7,630,527, 7,620,218, 7,606,417, 7,587,068, 7,403,643, 7,352,394, 6,407,777, 7,269,292, 7,308,156, 7,315,631, 7,336,821, 7,295,233, 6,571,003, 7,212,657, 7,039,222, 7,082,211, 7,184,578, 7,187,788, 6,639,685, 6,628,842, 6,256,058, 5,579,063, 6,480,300, 5,781,650, 7,362,368, 7,551,755, 7,515,740, 7,469,071 and 5,978,519; and U.S. published application nos. 2005/0041121, 2007/0110305, 2006/0204110, PCT/US2006/021393, 2005/0068452, 2006/0120599, 2006/0098890, 2006/0140455, 2006/0285754, 2008/0031498, 2007/0147820, 2007/0189748, 2008/0037840, 2007/0269108, 2007/0201724, 2002/0081003, 2003/0198384, 2006/0276698, 2004/0080631, 2008/0106615, 2006/0077261, 2007/0071347, 20060228040, 20060228039, 20060228038, 20060228037, 20060153470, 20040170337, and 20030223622, 20090273685, 20080240555, 20080232711, 20090263022, 20080013798, 20070296833, 20080219517, 20080219518, 20080292193, 20080175481, 20080220750, 20080219581, 20080112599, 20080317379, 20080205712, 20090080797, 20090196466, 20090080713, 20090303343, 20090303342, 20090189998, 20090179998, 20090189998, 20090189997, 20090190803, and 20090179999; and U.S. patent applications Nos. 60/829,127, 60/914,962, 61/019,370, 61/023,855, 61/221,467, 61/221,425, 61/221,417, 61/182,625, 61/221,455, 61/120,289, and Ser. No. 12/479,658.

What is claimed is:

1. A method of displaying a participant during a video conference against a blurred or otherwise unclear background, comprising:
   using an imaging device including an optic, an image sensor and a processor;
   detecting a face within a digitally-acquired image;
   determining a distance of the face from a video camera component, including determining a sharpest of two or more color channels of image data acquired with said same image sensor, and calculating the distance based on the determining of the sharpest of the two or more color channels
   identifying at least one portion of the scene other than the face as comprising a background object that is a different distance from the video camera component than the face; and
   blurring or otherwise rendering unclear the background object.

2. The method of claim 1, further comprising enhancing an audio or visual parameter of the face, or both.

3. The method of claim 2, further comprising enhancing loudness, audio tone, or sound balance of words being spoken by a person associated with the face, or enhancing luminance, color, contrast, or size or location within the scene of the face, or combinations thereof.

4. The method of claim 1, further comprising recognizing and identifying the face as that of a specific person.

5. The method of claim 4, further comprising tagging the face with a stored identifier.

6. The method of claim 1, further comprising increasing a size of the face or centering the face, or both.

7. The method of claim 1, further comprising enhancing brightness, luminance contrast, color or color balance of the face, or combinations thereof.

8. The method of claim 1, wherein the determining of the distance of the face from the video camera component comprises determining one or more distances and/or other geometric characteristics of detected face features.

9. The method of claim 1, wherein the determining of the different distances comprises using a fixed focus lens.

10. The method of claim 1, wherein the determining of the sharpest of two or more color channel comprises calculating the following:

$$\text{sharpest} = \left\{ j \,\bigg|\, \frac{\sigma_j}{AV_j} = \max\left(\frac{\sigma_r}{AV_r}; \frac{\sigma_g}{AV_g}; \frac{\sigma_b}{AV_b}\right) \right\} \quad (3$$

Where AVi comprise averages of pixels for the three color channels {j|r, g, b}.

11. The method of claim 10, wherein the determining of the sharpest of two or more color channel further comprises calculating the following:

$$\sigma_i = \sqrt{\frac{1}{N} \sum_{pixels \in i} \sum (i - AV_i)^2} \quad (1$$

where $i \in \{R, G, B\}$

Or $$\sigma_i \cong \frac{1}{N} \sum_{pixels \in i} \sum |i - AV_i| \quad (2$$

where $i \in \{R, G, B\}$.

12. One or more non-transitory computer-readable storage media having code embedded therein for programming a processor to perform a method of displaying a participant during a video conference against a blurred or otherwise unclear background, wherein the method comprises:
   detecting a face within a digitally-acquired image;
   determining a distance of the face from a video camera component, including determining a sharpest of two or more color channels of image data acquired with said same image sensor, and calculating the distance based on the determining of the sharpest of the two or more color channels;
   identifying at least one portion of the scene other than the face as comprising a background object that is a different distance from the video camera component than the face; and
   blurring or otherwise rendering unclear the background object.

13. The one or more computer-readable storage media of claim 12, wherein the method further comprises enhancing an audio or visual parameter of the face, or both.

14. The one or more computer-readable storage media of claim 13, wherein the method further comprises enhancing loudness, audio tone, or sound balance of words being spoken by a person associated with the face, or enhancing luminance, color, contrast, or size or location within the scene of the face, or combinations thereof.

15. The one or more computer-readable storage media of claim 12, wherein the method further comprises recognizing and identifying the face as that of a specific person.

16. The one or more computer-readable storage media of claim 15, wherein the method further comprises tagging the face with a stored identifier.

17. The one or more computer-readable storage media of claim 12, wherein the method further comprises increasing a size of the face or centering the face, or both.

18. The one or more computer-readable storage media of claim 12, wherein the method further comprises enhancing brightness, luminance contrast, color or color balance of the face, or combinations thereof.

19. The one or more computer-readable storage media of claim 12, wherein the determining of the distance of the face from the video camera component comprises determining one or more distances and/or other geometric characteristics of detected face features.

20. The one or more computer-readable storage media of claim 12, wherein the determining of the different distances comprises using a fixed focus lens.

21. The one or more computer-readable storage media of claim 12, wherein the determining of the sharpest of two or more color channel comprises calculating the following:

$$\text{sharpest} = \left\{ j \,\middle|\, \frac{\sigma_j}{AV_j} = \max\left(\frac{\sigma_r}{AV_r}; \frac{\sigma_g}{AV_g}; \frac{\sigma_b}{AV_b}\right) \right\} \quad (3)$$

Where AVi comprise averages of pixels for the three color channels {j|r, g, b}.

22. The one or more computer-readable storage media of claim 21, wherein the determining of the sharpest of two or more color channel further comprises calculating the following:

$$\sigma_i = \sqrt{\frac{1}{N} \sum_{\text{pixels} \in i} \sum (i - AV_i)^2} \quad (1)$$

where $i \in \{R, G, B\}$

Or $$\sigma_i \cong \frac{1}{N} \sum_{\text{pixels} \in i} \sum |i - AV_i| \quad (2)$$

where $i \in \{R, G, B\}$.

23. A video conferencing apparatus, comprising:
a video camera including a lens, and an image sensor;
a microphone;
a display;
a processor;
one or more networking connectors; and
one or more computer-readable storage media having code embedded therein for programming a processor to perform a method of displaying a participant during a video conference against a blurred or otherwise unclear background, wherein the method comprises:
detecting a face within a digitally-acquired image;
determining a distance of the face from a video camera component, including determining a sharpest of two or more color channels of image data acquired with said same image sensor, and calculating the distance based on the determining of the sharpest of the two or more color channels;
identifying at least one portion of the scene other than the face as comprising a background object that is a different distance from the video camera component than the face; and
blurring or otherwise rendering unclear the background object.

24. The apparatus of claim 23, wherein the method further comprises enhancing an audio or visual parameter of the face, or both.

25. The apparatus of claim 24, wherein the method further comprises enhancing loudness, audio tone, or sound balance of words being spoken by a person associated with the face, or enhancing luminance, color, contrast, or size or location within the scene of the face, or combinations thereof.

26. The apparatus of claim 23, wherein the method further comprises recognizing and identifying the face as that of a specific person.

27. The apparatus of claim 26, wherein the method further comprises tagging the face with a stored identifier.

28. The apparatus of claim 23, wherein the method further comprises increasing a size of the face or centering the face, or both.

29. The apparatus of claim 23, wherein the method further comprises enhancing brightness, luminance contrast, color or color balance of the face, or combinations thereof.

30. The apparatus of claim 23, wherein the determining of the distance of the face from the video camera component comprises determining one or more distances and/or other geometric characteristics of detected face features.

31. The apparatus of claim 23, wherein the determining of the different distances comprises using a fixed focus lens.

32. The apparatus of claim 23, wherein the determining of the sharpest of two or more color channel comprises calculating the following:

$$\text{sharpest} = \left\{ j \,\middle|\, \frac{\sigma_j}{AV_j} = \max\left(\frac{\sigma_r}{AV_r}; \frac{\sigma_g}{AV_g}; \frac{\sigma_b}{AV_b}\right) \right\}. \quad (3)$$

Where AVi comprise averages of pixels for the three color channels {j|r, g, b}.

33. The apparatus of claim 32, wherein the determining of the sharpest of two or more color channel further comprises calculating the following:

$$\sigma_i = \sqrt{\frac{1}{N} \sum_{\text{pixels} \in i} \sum (i - AV_i)^2} \quad (1)$$

where $i \in \{R, G, B\}$

Or $$\sigma_i \cong \frac{1}{N} \sum_{\text{pixels} \in i} \sum |i - AV_i| \quad (2)$$

where $i \in \{R, G, B\}$.

* * * * *